US012577151B2

(12) United States Patent
Qin et al.

(10) Patent No.: US 12,577,151 B2
(45) Date of Patent: Mar. 17, 2026

(54) SAFETY STRENGTHENED GLASS WITH TENSILE STRESS AREA WITH LOW VARIATION AMPLITUDE, AND PREPARATION METHOD AND APPLICATION THEREOF

(71) Applicant: CHONGQING AUREAVIA HI-TECH GLASS CO., LTD, Chongqing (CN)

(72) Inventors: Wencheng Qin, Chongqing (CN); Wei Hu, Chongqing (CN); Baoquan Tan, Chongqing (CN); Hong Jiang, Chongqing (CN)

(73) Assignee: Chongqing Aureavia Hi-Tech Glass Co., Ltd., Chongqing (CN)

( * ) Notice: Subject to any disclaimer, the term of this patent is extended or adjusted under 35 U.S.C. 154(b) by 818 days.

(21) Appl. No.: 17/514,890

(22) Filed: Oct. 29, 2021

(65) Prior Publication Data

US 2022/0135474 A1     May 5, 2022

(30) Foreign Application Priority Data

Oct. 30, 2020     (CN) ......................... 202011193636.4

(51) Int. Cl.
| | |
|---|---|
| *C03C 21/00* | (2006.01) |
| *C03C 3/093* | (2006.01) |
| *C03C 3/097* | (2006.01) |

(52) U.S. Cl.
CPC ............ *C03C 21/002* (2013.01); *C03C 3/093* (2013.01); *C03C 3/097* (2013.01)

(58) Field of Classification Search
CPC ......... C03C 3/091; C03C 3/093; C03C 3/085; C03C 21/002
See application file for complete search history.

(56) References Cited

U.S. PATENT DOCUMENTS

2016/0102011 A1*   4/2016   Hu ...................... C03C 10/0027
                                                        428/155
2019/0389764 A1   12/2019   Andrews et al.
2020/0002225 A1    1/2020   Schneider

FOREIGN PATENT DOCUMENTS

CN         109455926 A     3/2019
CN         110040982 A     7/2019
(Continued)

OTHER PUBLICATIONS

Chinese Patent Application No. 202011193636.4, English translation of Office Action dated Jul. 14, 2022, 8 pages.
(Continued)

*Primary Examiner* — Matthew E. Hoban
(74) *Attorney, Agent, or Firm* — Cozen O'Connor

(57)     ABSTRACT

The present invention relates to safe strengthened glass with a low-variation-amplitude tensile stress region, a preparation method and an application. The change curve of the compressive stress and tensile stress of the strengthened glass meets a specific function relationship; within the range of 0.45-0.85 mm, the stress distribution meets the following condition: the stress curve is within the following Log-PI function range, the upper limit Fmax of the compressive stress meets the formula (1): Fmax=b+(2*a/PI)*(w/(4*(x−c)^2+w^2)), and the lower limit Fmin of the compressive stress meets the formula (2): Fmin=b+(2*a/PI)*(w/(4*(x−c)^2+w^2)); or the chemically strengthened glass comprises a first stress region and a second stress region, wherein the stress range of a first subregion in the first stress region includes that the minimum value of the stress difference value of the glass thickness t in the region of 0-10 micrometers is greater than 1 Mpa; and the pressure difference value of the second stress region is smaller than that of the first stress region. The deep compressive stress region of the strengthened glass has relatively high stress, and the tensile (Continued)

stress region has very-low-degree variation amplitude, so
that the glass has excellent mechanical strength, very high
stability and very high safety.

18 Claims, 7 Drawing Sheets

(56)                    References Cited

FOREIGN PATENT DOCUMENTS

| CN | 110240419 | A | 9/2019 |
|----|-----------|---|--------|
| CN | 110255892 | A | 9/2019 |
| CN | 110330228 | A | 10/2019 |
| JP | 2019-55911 | A | 4/2019 |
| WO | WO 2017126605 | A1 | 7/2017 |
| WO | WO 2021003212 | A1 | 1/2021 |
| WO | WO 2021041031 | A1 | 3/2021 |

OTHER PUBLICATIONS

European Patent Application No. 21205528.9, extended search and
opinion dated Jul. 8, 2022, 11 pages.
Chinese Patent Application No. 202011193636.4, 2nd Office Action
with English translation dated Feb. 11, 2023, 15 pages.
Chinese Patent Application No. 202011193636.4, Decision of Rejec-
tion with English translation dated Jun. 27, 2023, 22 pages.
Korean Patent Application No. 10-2021-0146207, Request for the
Submission of an Opinion with English translation dated Aug. 2,
2023, 42 pages.

* cited by examiner

SAFETY STRENGTHENED GLASS WITH TENSILE STRESS AREA WITH LOW VARIATION AMPLITUDE, AND PREPARATION METHOD AND APPLICATION THEREOF

RELATED APPLICATION

This application claims priority to Chinese Patent Application No. 202011193636.4 filed Oct. 30, 2020, the entire contents of which are incorporated herein by reference.

TECHNICAL FIELD

The present invention relates to a strengthened safety glass with a low-variation-amplitude tensile stress region, the change speed of the tensile stress region of a glass substrate is gentle and gradual, the increase amplitude is small, the tensile stress region has safety, and the stability of the glass is maintained during use. The strengthened safety glass with the low-variation-amplitude tensile stress region is suitable for electronic display equipment, particularly suitable for the field of cover plate protection in electronic display equipment.

BACKGROUND ART

Chemically strengthened glass is typically manufactured by a high-temperature ion exchange process. Large alkali metal ions in high-temperature molten salt replace small alkali metal ions in the glass, so that exchange ion volume difference is generated. As a result, tensile stress gradient from high to low is generated on certain surface layer of the glass, which hinders or delay expansion of glass microcracks, thereby achieving the goal of improving the mechanical strength of the glass.

The tensile stress region of the chemically strengthened glass affects the stability of the glass. When glass is impacted, the tensile stress region acts as an facilitator for cracking of the glass. If the degree of change in the tensile stress region is too big, the glass may easily break in low impact, and the strength stability of the glass is compromised. This results in instability of product properties of the glass and difficulty in mass production.

At present, strengthening standard for chemically strengthened glass and safety method for the chemically strengthened glass are not set properly. Sometimes, the strengthening standard and the safety method are contradictory to each other. If the degree of strengthening of the glass is unilaterally required to be increased, the bearing range of the glass is likely to be exceeded, and the glass is unsafe. The optimal stress state of the glass is not achieved. Sometimes, the degree of strengthening is insufficient, and the glass strength cannot be improved by exerting the limit strengthening property region of the glass.

If the structure of the glass is not strong and tensile stress is too big, the chemically strengthened glass is easy to explosively crack under slight impact. Sometimes, even spontaneous explosion may occur. Product reliability and the personal safety are of serious concern. However, tensile stress and compressive stress are in a symbiotic relationship. Chemically strengthened glass needs to have certain compressive stress to maintain high mechanical strength, and so the internal tensile stress cannot be avoided. However, the internal stress may be maintained at an optimal state through distribution of the internal stress.

SUMMARY OF THE INVENTION

The problems existing in the prior art include that existing chemically strengthened glass cannot have high mechanical strength and moderate tensile stress at the same time, so that the problems of insufficient strength stability, insufficient strengthening degree, easiness in explosion cracking and the like exist.

In order to solve the above technical problem, the present invention aims to provide a safe strengthened glass with a low-variation-amplitude tensile stress region. The deep compressive stress region of the glass has high-degree stress, the anti-falling level may be effectively improved, and the tensile stress region has quite-low-degree change amplitude and quite high stability and safety. The better mechanical strength, especially the anti-falling property, of the glass may be better and safely exerted.

Specifically, the Present Invention Provides the Following Technical Solutions:

on the one hand, the present invention provides chemically strengthened glass, within a range of 0.45-0.85 mm, the stress distribution of the chemically strengthened glass meets the following conditions:

the stress curve of the chemically strengthened glass is located in the following Log-PI function range, the upper limit Fmax of compressive stress meets the formula (I):

$$Fmax=b+(2*a/PI)*(w/(4*(x-c)^2+w^2))$$

wherein Fmax represents the maximum value of the compressive stress of the glass; the value of b is $-81$, the value of a is $1.11*10^7$, w is 1.985, the value of c is $-60.64$, x is the depth of a stress point, the unit is micrometer, and PI is return digital constant 3.14159265358979, the lower limit Fmin of the compressive stress meets the following formula (2):

$$Fmin=b+(2*a/PI)*(w/(4*(x-c)^2+w^2))$$

wherein Fmin represents the minimum value of the compressive stress of the glass; the value of b is $-120.94$, the value of a is $1.11*10^7$, w is 1.3, the value of c is $-72.64$, x is the depth of the stress point, the unit is micrometer, wherein the depth of the stress point refers to the depth from the surface of the glass to the center of the glass.

On the other hand, the present invention provides chemically strengthened glass, and the stress distribution of the chemically strengthened glass meets the following conditions:

the chemically strengthened glass has the stress distribution with the following characteristics: a first stress region and a second stress region are included, wherein the first stress region is a compressive stress region, and the second stress region is a tensile stress region, wherein the stress range of a first subregion in the first compressive region includes that the minimum value of the stress difference value of depth from the glass surface t in a region of 0-10 micrometers is greater than 1 Mpa, preferably greater than 5 Mpa, and more preferably greater than 10 Mpa, the maximum value is smaller than 100 Mpa, and the stress difference value is an absolute value of difference between compressive stress at first 0.5 micrometer and compressive stress (CS) at last 0.5 micrometer; wherein a second subregion of the first stress region is a region of 0.03 T to DOL-0-1 and a region of DOL-0-2 to 0.97 T of the glass thickness, and the stress difference value of the region is between 0.4 Mpa and 5 Mpa, and preferably between 0.5 Mpa and 3.5 Mpa;

wherein stress difference value of the second stress region is smaller than that of the first stress region; the second stress region has a first subregion, the first subregion of the second stress region is a region of DOL-0-1 to 0.4 T and 0.6 T to DOL-0-2, the stress difference value of the region is smaller than 1 Mpa, preferably smaller than 0.8 Mpa, and more preferably smaller than 0.5 Mpa; and moreover, the second stress region has a second subregion, the range of the second subregion of the second subregion is 0.4 T-0.6 T, and the stress difference value of the second subregion of the second subregion is smaller than 0.2 Mpa, and preferably smaller than 0.1 Mpa; and CT-LD of the sample is greater than 35000 Mpa/mm, and preferably between a mark band threshold and a bifurcation threshold.

Preferably, the preparation raw materials of the chemically strengthened glass contain oxides in the following proportions in mol %:

| composition | mol % |
| --- | --- |
| $SiO_2$ | 55%-75% |
| $Al_2O_3$ | 8%-22% |
| $B_2O_3$ | 0%-5% |
| $P_2O_3$ | 0%-5% |
| MgO | 1%-8% |
| ZnO | 0-2% |
| ZrO2 | 0-2% |
| TiO2 | 0-2% |
| $Na_2O$ | 0%-5% |
| $Li_2O$ | 4%-13% |
| $K_2O$ | 0-5% |
| $SnO_2$ | 0.1%-2%. |

Preferably, the preparation raw materials of the chemically strengthened glass contain oxides in the following proportions in mol %:

| composition | mol % |
| --- | --- |
| $SiO_2$ | 61-70% |
| $Al_2O_3$ | 10-19% |
| $B_2O_3$ | 0% |
| $P_2O_3$ | 0% |
| MgO | 2-6% |
| ZnO | 0-1% |
| ZrO2 | 0.5-1% |
| TiO2 | 0.5-1% |
| $Na_2O$ | 2-5% |
| $Li_2O$ | 5.5-12% |
| $K_2O$ | 1-2.8% |
| $SnO_2$ | 0.1-0.4%. |

Preferably, the total mol percentage composition of $SiO_2$ and $Al_2O_3$ in the chemically strengthened glass is greater than 80 mol %;

or, $Na_2O$ is 1.5%-5% in mol %;

or, $Li_2O$ is 5.5%-12% in mol %, and more preferably 8%-12%;

or, $Na_2O+Li_2O$ is 7%-18% in mol %, and preferably 10.5%-14%;

or, MgO is 2%-7.5% in mol %, and more preferably 2.5%-5%.

Preferably, the preparation raw materials of the chemically strengthened glass further contain tin oxide and/or sodium chloride as clarifying agents, preferably, the contents of the tin oxide and the sodium chloride do not exceed 1 mol %, and is more preferably 0.4-1 mol %. Preferably, the value of the Vickers hardness of the chemically strengthened glass is between 600 kgf/mm$^2$ and 630 kgf/mm$^2$ under the conditions that the load is 300 g, and pressure is maintained for 10 s.

Preferably, the Young modulus of the chemically strengthened glass is 80 Gpa or above.

Preferably, the atom packing density of the chemically strengthened glass is greater than 0.531.

Preferably, the dielectric constant of the chemically strengthened glass is 5.5-7.5.

Preferably, the bifurcation threshold of the chemically strengthened glass is 60% or above of CT-LDmax of the chemically strengthened glass; or the mark band threshold is 50% or above of CT-LDmax of the chemically strengthened glass.

Preferably, the pantograph ratio of the chemically strengthened glass is 80% or above of total pantograph ratio.

Preferably, the tensile stress linear density CT-LD of the chemically strengthened glass is between 30000 Mpa/mm and 60000 Mpa/mm, and is preferably between 35000 Mpa/mm and 50000 Mpa/mm.

Preferably, CS-30 of the chemically strengthened glass meets the following formula, $$CS\text{-}30\text{-}a^*\exp(-T/b)+c,$$

wherein CS-30 is compressive stress of the depth distant from the surface of the strengthened glass by 30 micrometers, the unit is MPa;

a is −485; b is 0.5; c is 278+40/T$^2$ or 278-40 T$^2$; T is the thickness of the strengthened glass, and the unit is mm.

On the other hand, the present invention further provides a preparation method of any foregoing chemically strengthened glass, and the chemically strengthened glass is prepared by a single-step strengthening method or a multi-step strengthening method.

The preparation method of the chemically strengthened glass according to claim 15, wherein salt bath of $NaNO_3$ and $KNO_3$ is adopted in the single-step strengthening method, wherein the mass content of $KNO_3$ in the mixture is 30-95 wt %, and preferably 80-90 wt %; and preferably, the temperature of the fusion mixture is 390-460° C., and preferably 400-450° C., and more preferably, the fusion mixture is subjected to ion exchange for 5-10 h.

Preferably, in the preparation method of the chemically strengthening glass, the multi-step strengthening method comprises two-step strengthening, wherein in the first step, salt bath of 75-100 wt % $NaNO_3$ is adopted, the temperature in the first step is preferably 425-430° C., and ion exchange lasts for 3-7 h preferably; and in the second step, salt bath of 0-10 wt % $NaNO_3$, preferably 3-10 wt % $NaNO_3$, is adopted, the preferable temperature of the second step is 430-440° C., and ion exchange lasts for 1-3 h preferably.

On the other hand, the present invention further provides chemically strengthened glass prepared by any foregoing preparation method.

On the other hand, the present invention provides application of any foregoing chemically strengthened glass in a display screen of a mobile phone, a display screen of a tablet personal computer, a handheld game player and a display screen of a portable digital device.

The change curves of the compressive stress and the tensile stress of the chemically strengthened glass of the present invention meet the specific function relation, the deep compressive stress region has high-degree stress, and the tensile stress region has quite-low-degree change amplitude, so that the glass has excellent mechanical strength and quite high stability and safety.

DETAILED DESCRIPTION OF THE INVENTION

The present invention provides chemically strengthened glass having the following stress characteristics so as to enable the chemically strengthened glass to have excellent mechanical strength, very high stability and meet very high safety standard.

The stress curve distribution of chemically strengthened glass meets any of the following two conditions, preferably, the following two conditions are met simultaneously:

(1) the stress curve of the chemically strengthened glass is in a Log-PI function range, the upper limit Fmax of the compressive stress meets the formula (1):

$$F\text{max}=b+(2*a/PI)*(w/(4*(x-c)\hat{}2+w\hat{}2))$$

wherein Fmax represents the maximum value of the compressive stress of the glass; the value of b is −81, the value of a is $1.11*10^7$, w is 1.985, the value of c is −60.64, x is the depth of a stress point, and the unit is micrometer. PI is return digital constant 3.14159265358979.

The lower limit Fmin of the compressive stress meets the formula (2):

$$F\text{min}=b+(2*a/PI)*(w/(4*(x-c)\hat{}2+w\hat{}2))$$

wherein Fmin represents the minimum value of the compressive stress; the value of b is −120.94, the value of a is $1.11*10^7$, w is 1.3, the value of c is −72.64, x is the depth of the stress point, and the unit is micrometer.

The depth of the stress point refers to the depth from the surface of the glass to the center of the glass.

Figure 1:
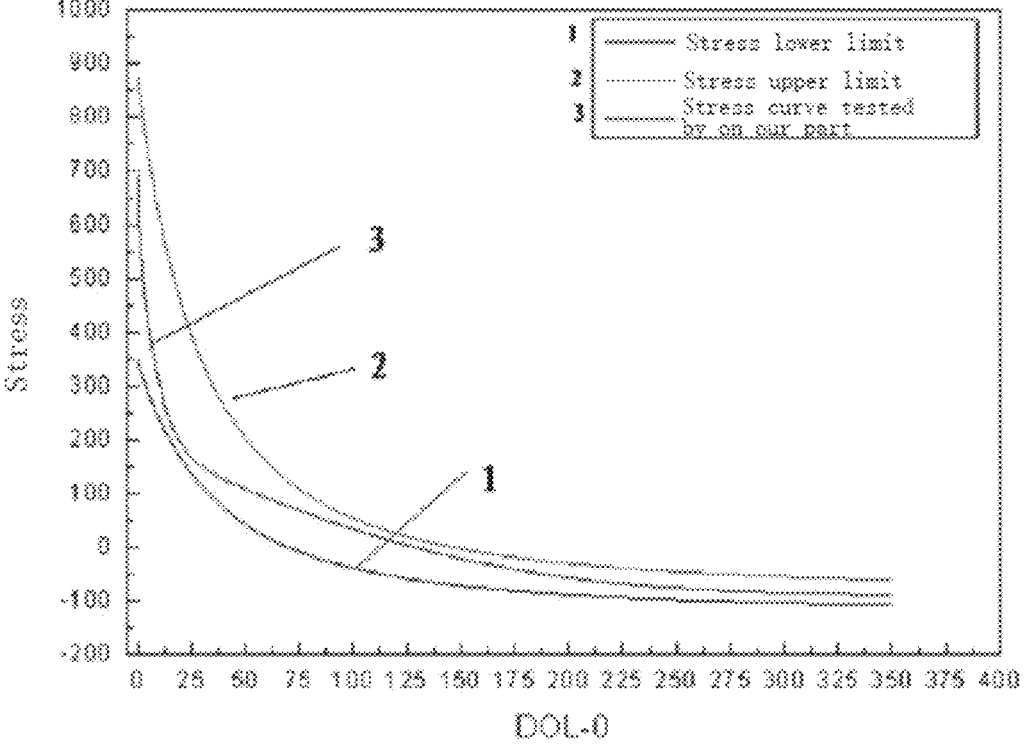
FIG. 1 is a schematic diagram of a change characteristic curve illustrating that the compressive stress of the glass is reduced along with increasing of DOL before the compressive stress of the glass is converted into tensile stress according to the present invention.

Specifically, the stress curve satisfying the above conditions is shown in FIG. 1, wherein the abscissa DOL represents the depth of the stress point of the glass product, and the depth of the stress point is generally less than DOC (the depth at which the compressive stress within the glass-based product changes to tensile stress). As can be seen in FIG. 1, before the compressive stress corresponding to the stress curve of the glass is converted into the tensile stress, the reduction slope of the compressive stress is lower than a stress lower limit change curve and higher than a stress upper limit curve;

or, (2) the chemically strengthened glass has the stress distribution with the following characteristics: a first stress region and a second stress region are included, wherein the first stress region is a compressive stress region, and the second stress region is a tensile stress region. The stress range of the first subregion in the first stress region includes that the minimum value of the stress difference value of the depth from the glass surface t in the region of 0-10 micrometers is greater than 1 MPa, preferably greater than 5 Mpa, further preferably greater than 7 Mpa, and more preferably greater than 10 Mpa. The maximum value is smaller than 100 Mpa.

The stress difference value is an absolute value of the difference between the stress at the front 0.5 micrometer and the stress (compressive stress on the surface of the chemically strengthened glass, called CS for short) at the last 0.5 micrometer.

The second subregion of the first stress region is a region of 0.03 T to DOL-0-1 and DOL-0-2 to 0.97 T of the thickness of the glass, and the stress difference of the region is between 0.4 Mpa and 5 Mpa, preferably between 0.5 Mpa and 3.5 Mpa. DOL-0 is the depth at which the stress is 0. Because glass has two surfaces, two symmetrical stress curves exist, generally we describe only half of them. DOL-0-1 is a front surface stress distribution cut-off point, and DOL-0-2 is a back surface stress distribution cut-off point.

The first subregion of the first stress region is mainly stress generated by potassium-sodium exchange and may reach high compressive stress (CS), but the reduction range is large, the stress layer is low, only the positive effect on surface scratch resistance can be achieved, but the impact resisting effect does not work well. Therefore, the stress change of the chemically strengthened glass is required to be uniform without pursuing the ultrahigh surface CS, the stress difference value of the chemically strengthened glass is less than 100 Mpa, and the circumstances that the impact resistance and bending resistance of the glass are reduced due to the fact that the stress difference value between the surface CS and the interior is too large in the chemical strengthening process and microcrack propagation is easily caused are reduced. Therefore, the first subregion of the first stress region is defined.

The main damage mode in the anti-falling process is impact damage of sharp objects such as gravel, the general impact depth is 30-40 micrometers in many experiments, then crack extension is generated at the tip end, and when the crack extension reaches a tensile stress region, cracks easily extend to cause breakage. Therefore, stress magnitude and stress distribution of the deep stress region of the glass resist key factors of anti-falling impact. Therefore, the stress CS-30 at the 30-micrometer position of the glass is very important to control, the position of CS-30 is required to have high-degree compressive stress in the second subregion of the first stress region, and the change amplitude of the stress difference value is small, so that extension of tip cracks is more favorably hindered, and the anti-falling ability of the glass can be better improved.

Figure 2:
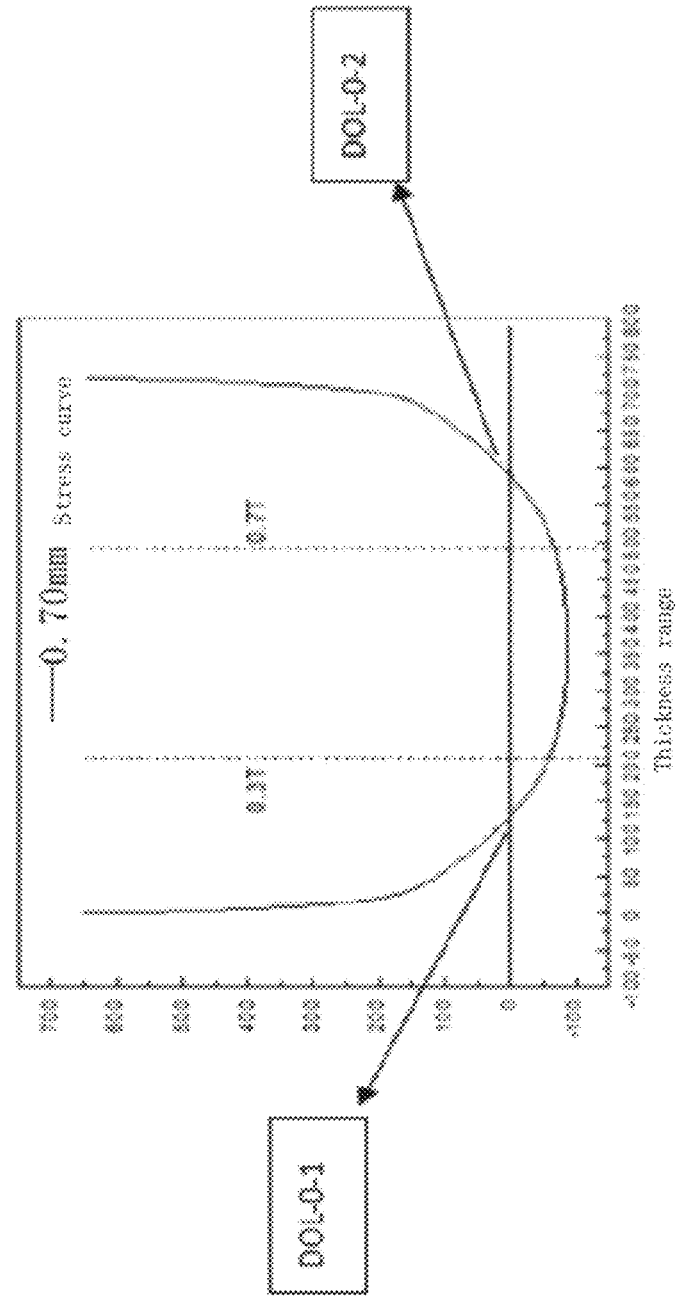
FIG. 2 is a diagram plotting the change curve of glass stress with the depth of a stress point according to example 6 of the present invention.

Specifically, in a preferred embodiment, the stress distribution of the chemically strengthened glass of the present invention is shown in FIG. 2.

The second stress region is a tensile stress region, the region occupied by the second stress region is larger than that occupied by the first stress region, and the second stress region actually has an assistance effect on crack propagation, so that the increase amplitude is smaller from the starting stage to the rising stage, the stress difference value needs to be lower, stress is slowly increased, and inhibition of the intrinsic network structure of the tensile stress region on cracks is facilitated. The stress of the tensile stress region is slowly increased, a rapid sudden change condition is avoided, stress concentration is avoided, and the impact resistance is improved and the stability is improved. Thus, the tensile stress region should satisfy the following conditions.

The stress difference value of the second stress region is smaller than that of the first stress region.

The second stress region has a first subregion that is DOL-0-1 to 0.4 T and 0.6 T to DOL-0-2. The stress difference value of the region is less than 1 Mpa, preferably less than 0.8 Mpa, and more preferably less than 0.5 Mpa. The second stress region has a second subregion in the range of 0.4 T-0.6 T with a stress difference value less than 0.2 Mpa, preferably less than 0.1 Mpa.

In 0 T-0.5 T or the T-0.5 T, the stress difference value is in the trend of gradually decreasing.

The tensile stress linear density CT-LD of the chemically strengthened glass is between 30000 Mpa/mm and 60000 Mpa/mm, and preferably between 35000 Mpa/mm and 50000 Mpa/mm. The highest value CT-CV of the tensile stress region is smaller than 100 Mpa, and preferably smaller than 90 Mpa. CT-CV is representation about the tensile stress region CT in test, and is generally the maximum value of CT, namely, the tensile stress in the center of the glass, called CT-CV for short.

CS is greater than 500 Mpa, stress depth DOL-Tai (stress depth generated by potassium-sodium exchange) generated by potassium-sodium exchange in FSm-6000 test is smaller than 6 micrometers.

Due to the fact that potassium-sodium exchange is mainly generated in a second strengthening process, if potassium-sodium exchange degree is high, part of sodium ions in the glass causes emigration effect in potassium-sodium exchange, weakening of deep stress caused by first-time exchange is caused, the anti-falling ability of the glass is reduced, and therefore, the stress depth DOL-Tail of the strengthened glass is smaller than 6 micrometers. The potassium-sodium exchange degree is low.

CS-30 of the chemically strengthened glass meets the following formula, $$CS\text{-}30 = a*\exp(-T/b) + c$$

wherein CS-30 is compressive stress of the depth distant from the surface of the strengthened glass by 30 micrometers;

a is −485; b is 0.5; c is $278+40/T^2$ or $278-40\ T^2$; and T is the thickness of the strengthened glass, and the unit is mm.

In order to achieve a chemically strengthened glass that satisfies the stress characteristics described above, the inventors have found that the glass substrate composition and characteristics are as follows:

the required glass substrate composition requirements are as follows.

In order to obtain the glass, numerous experimental explorations have been made by the inventors to provide the glass with the specific composition (components in mole percent) as set forth in Table 1 below.

TABLE 1

| Composition | mol % |
| --- | --- |
| $SiO_2$ | 55%-75% |
| $Al_2O_3$ | 8%-22%% |
| $B_2O_3$ | 0%-5% |
| $P_2O_3$ | 0%-5% |
| MgO | 1%-8% |
| ZnO | 0-2% |
| $ZrO_2$ | 0-2% |
| $TiO_2$ | 0-2% |
| $Na_2O$ | 0%-5% |
| $Li_2O$ | 4%-13% |
| $K_2O$ | 0-5% |
| $SnO_2$ | 0.1%-2% |

In the glass frit formula shown in Table 1, the glass network composition is mainly $SiO_2$ and $Al_2O_3$, the high network structure composition may increase the amount of bridging oxygen of the glass, and especially, the high $SiO_2$ amount may effectively reduce the dielectric constant of existing lithium-aluminum-silicon glass. In addition, the network structure strength of the glass may be improved, the high network structure strength is beneficial to reducing the stress relaxation effect generated by the glass in ion exchange, and the weakening effect of factors such as high temperature and long time in ion exchange on deep stress in composite compressive stress is relieved, so that the glass may adopt lower alkali metal ions; high-temperature single binary ion exchange is carried out on low-content alkali metal components, so that the composite compressive stress with certain depth and high tensile stress linear density is obtained. Reduction of the content of alkali metal ions free in the glass network is also beneficial to reduction of the dielectric constant.

In the sample, the total amount of $SiO_2$ and $Al_2O_3$ is greater than 80 mol %.

$B_2O_3$ is of a glass sub-network structure, high-temperature melting of the glass may be promoted by adding $B_2O_3$, the melting difficulty is reduced, the ion exchange rate of the glass may be increased by adding $B_2O_3$, and the network structure may be weakened by adding boron. Thus, $B_2O_3$ is added in an amount of 0-5%.

$Na_2O$ is a main component of ion exchange and is a key exchange ion for forming surface high compressive stress, but $Na_2O$ may reduce bifurcation threshold and mark band threshold of the glass and is not favorable for improving CT-Ldmax of the glass, so that $Na_2O$ is preferably from 0% to 5% in mol %, preferably from 1.5% to 5%, more preferably from 3% to 5%.

$Li_2O$ is a main component of ion exchange and is a key exchange ion for forming deep compressive stress, and preferably, the content of $Li_2O$ is 5.5%-12%, more preferably from 8% to 12%.

Due to the fact that $Na_2O$ and $Li_2O$ are alkali metal oxides and are in a free state in the glass, redundant oxygen ions may break bridging oxygen and break a network structure, the dielectric constant of the glass is increased, and the dielectric loss of the glass is increased due to excessive alkali metal original number.

Therefore, $Na_2O+Li_2O$ is 7%-18%, preferably 10.5%-14%.

$K_2O$ is a main component of ion exchange and may effectively adjust the dielectric constant of the glass, because the touchability of the cover plate glass requires that the dielectric constant is not too low, and 5G communication requires that the dielectric constant cannot be too high, the dielectric constant of the glass may be adjusted by $K_2O$, and the potassium-sodium and sodium-lithium ion exchange is not affected by adding a small amount of $K_2O$. So $K_2O$ is 0%-5%.

MgO is used as a network intermediate and has the effects of reducing the high-temperature viscosity of the glass and increasing the Young modulus of the glass. However, alkaline earth metal and alkali metal are main carriers of current in the glass, the dielectric constant and dielectric loss of the glass may be greatly improved by introducing too much alkaline earth metal and alkali metal, and a mixed alkali or alkaline earth effect may be generated by introducing different alkali metals and alkaline earth metals, so that the dielectric property of the glass is destroyed. So MgO is preferably from 2% to 7.5%, and more preferably from 2.5% to 5%.

The melting temperature of the substrate glass is between 1630° C. and 1700° C., so that the clarifying agent of the substrate glass is selected as tin oxide and/or sodium chloride, and the content of the tin oxide and/or the sodium chloride does not exceed 1 mol %.

The melting temperature of the glass with the batch formula is between 1630° C. and 1700° C.; and the value of the Vickers hardness is between 600 and 630 under the conditions that the load is 300 g and the pressure is maintained for 10 s.

The Vickers hardness is high, so that the scratch resistance of the glass is improved; and the sample has Young modulus of 80 Gpa or above.

The atom packing density of the sample is greater than 0.531, and the atom packing density is calculated according to the batch formula and the density of the sample.

The dielectric constant of the glass which is not strengthened is 5.5-7.5.

In the application of cover plate glass, the touch property is reduced due to an excessively low dielectric constant, and 5G communication signals are affected due to an excessively high dielectric constant.

In lithium-aluminum-silicon glass, sodium-lithium exchange is very sensitive to lithium ions in a salt bath, and a small amount of lithium ions may seriously affect the sodium-lithium exchange property, so that deep compressive stress and CT-LDmax are weakened, and the anti-falling ability is reduced. The vast majority of lithium ions in the salt bath are exchanged out of the glass by sodium-lithium exchange.

Thus, according to multiple experiments, the lithium ion precipitation property of the glass substrate of the present invention includes that under the condition that 100% sodium nitrate*440° C.*5 h (meaning that the glass is strengthened in 100% sodium nitrate bath salt at a strengthening temperature of 440° C. for 5 h), in every 100 kg of the salt bath, lithium ions released into the salt bath due to sodium-lithium exchange per square meter account for no more than 100 PPm of the total mass of the salt bath.

The bifurcation threshold of the glass substrate (before strengthening) is 60% or above of CT-LDmax of the chemically strengthened glass, and the mark band threshold is 50% or above of CT-LDmax of the chemically strengthened glass. In a 5% sodium nitrate and 95% potassium nitrate salt bath, strengthening is carried out at 440° C. for 1 h, in an FSm-6000 test, CS is 450 Mpa or above, and DOL-tail is larger than 3 micrometers.

In the breaking process of the glass, a broken region, generated due to tensile stress, of a fracture surface becomes a mark band; the mark band threshold refers to the tensile stress linear density of the glass when the mark band is generated on the cross section of the glass during immediate fracture; the bifurcation threshold refers to the tensile stress linear density of the glass when the cross section of the glass is bifurcated during immediate fracture. The tensile stress linear density (CT-LD) refers to the ratio of the tensile stress integral to the thickness of the glass under the thickness section of the glass.

In order to obtain a chemically strengthened glass having the properties described above, the strengthening method is described below.

The glass disclosed by the present invention belongs to a composite compressive stress layer formed by carrying out $K^+$—$Na^+$ and $Na^+$—$Li^+$ binary ion exchange on lithium-silicon-aluminum glass. Because of the smaller $Li^+$ radius, it is easier to migrate and exchange in the glass network architecture. The ion exchange strengthening method may be carried out in multiple steps, such as two steps, and may also be carried out in a single step.

In the multi-step method, during strengthening in the first step, the molar ratio of sodium nitrate to the total amount of sodium nitrate and potassium nitrate in a salt bath is larger than the molar ratio of $Na_2O/Li_2O+Na_2O+K_2O$ in the components of the glass, the glass pantograph ratio reaches 80% or above of the total pantograph ratio, and during strengthening in the last step, the molar ratio of sodium nitrate to the total amount of sodium nitrate and potassium nitrate in the salt bath is smaller than the molar ratio of $Na_2O/Li_2O+Na_2O+K_2O$ in the components of the glass, and the glass pantograph ratio is controlled to be between 0.15% and 0.2%. The glass pantograph ratio refers to that the chemically strengthened glass expands in size after being strengthened, and the pantograph ratio is the ratio of the expansion amount to the original size.

Specifically, the strengthening method for chemical ion exchange may be carried out in two steps as follows: (1) a first step: ion exchange is carried out in a mixed molten salt composed of $NaNO_3$ and $KNO_3$ with a $NaNO_3$ content (wt %) of 30-100%, $Na^+$—$Li^+$ exchange is adopted as a main part ($Li^+$ in the glass is obtained by exchange), and extremely deep DOL-0 (>120 μm) is obtained; (2) a second step: ion exchange is carried out in a mixed molten salt composed of $NaNO_3$ and $KNO_3$ with the $NaNO_3$ content (wt %) being 0-10%, preferably 3-10%, $K^+$—$Na^+$ exchange is adopted as a main part ($Na^+$ in the glass is obtained by exchange), and higher surface compressive stress is obtained; and after the two steps are completed, a thick composite compressive stress layer is formed on the surface of the glass.

The strengthening method for chemical ion exchange of the glass of the present invention may also be carried out in one step as described below (hereinafter referred to as a single step or a single pass process). In the single-step method, a salt bath is a mixed salt bath of potassium nitrate and sodium nitrate, the molar ratio of sodium nitrate to the total amount of sodium nitrate and potassium nitrate in the salt bath is smaller than the molar ratio of $Na_2O/Li_2O+Na_2O+K_2O$ in the components of the glass and larger than mol % of $Na_2O$ to the total components, and ion exchange is generally carried out in mixed molten salt composed of $NaNO_3$ and $KNO_3$ with the $KNO_3$ content (wt %) being 30-100%; and the strengthening temperature is between 390° C. and 460° C. The glass pantograph ratio of the strengthened sample is controlled to be 0.15%-0.2%.

In the strengthening method, in all the salt baths strengthened in each step, the lithium ion concentration accounts for 0.25% of the molar ratio of the total alkali metal ions in the salt baths. The lithium ions in the salt baths are hindrance ions for potassium-sodium and sodium-lithium exchange, and the ion exchange degree may be greatly reduced and the strengthening state of the sample may be weakened due to existence of a small amount of the lithium ions.

Before chemical strengthening, a preheating procedure at 300-400° C. needs to be carried out for 10-30 min, and a thermal migration procedure at 350-500° C. needs to be carried out for 15-120 min between every two steps of multiple strengthening steps.

In the single-step strengthening or in the multi-step strengthening, strengthening of the glass is stopped when the surface CS of the batch of samples drops to 10-20% of the initial batch during successive strengthening of the batch in each step of the salt bath, and strengthening is stopped when the surface CS of the batch of samples drops to 5-20% of the initial batch during successive strengthening of the batch in each step of the salt bath.

Specific embodiments on how to prepare the chemically strengthened glass of the present invention and the stress property characteristics of the chemically strengthened glass of the present invention are described in detail below by way of examples.

EXAMPLES

Example 1

At 1650° C., various raw materials (industrial conventional raw materials) are matched according to the component proportion of batch formula 1, the raw materials are melted in a platinum dry pot, defoaming and clarifying treatment is carried out by using sodium chloride serving as a clarifying agent, then the treated raw materials are poured into a stainless steel mold preheated at 300° C. (generally preheated to 200-400° C.), and the stainless steel mold, together with the raw materials, is placed into a muffle furnace at 650° C. for 24 h of annealing, and then cutting, CNC machining (computer numerical control machining) and polishing are carried out to obtain plane glass with the smooth mirror surface. The specification of the processed plain glass is a sample with the specification of 50*50*0.7 mm.

Then, the Young modulus of the obtained sample is tested by a sonic method, and the instrument is an IET-1600P high-temperature elastic modulus tester.

The dielectric constant of the sample is tested by a dielectric constant tester ITACA & AET.

The processed specification sample is placed into high sodium salt for strengthening, and is taken out every fixed time for stress testing, and the surface high stress region and the internal deep stress of the strengthened sample are respectively tested by using a waveguide optical stress meter FSM-6000LE and a scattered light SLP-1000 stress meter manufactured by the Japan ORIHARA company. Change of the CT value is in a parabolic trend. The CT value rapidly rises to the highest point, and if strengthening continues again, the CT value slowly descends. CT-LD will also vary in such a way that the value at the highest point is CT-LDmax.

An SLP-1000 stress meter is used for testing, a photoelastic coefficient and a refractive index are set for conventional testing of surface compressive stress, the depth sum of the compressive stress and the highest value CT-CV of the tensile stress region, the tensile stress linear density is a calculated value, and the sum of the tensile stress tested by the SLP-1000 stress meter is divided by the thickness of the glass.

Figure 3:
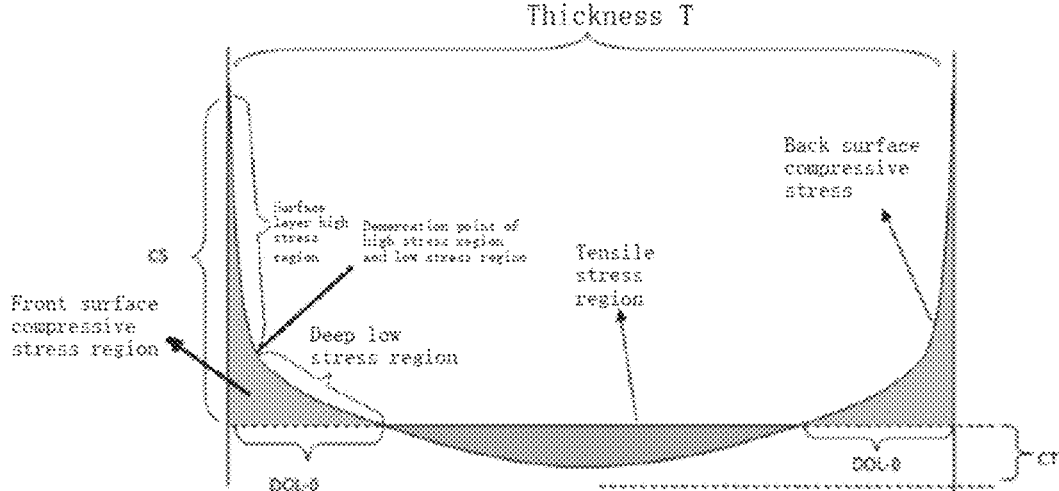
FIG. 3 is a schematic diagram of the change in stress of the glass of the present invention with the change in depth of the stress point.

Surface compressive stress (MPa): after the glass is chemically strengthened, alkali metal ions with smaller radii on the surface are replaced by alkali metal ions with larger radii, and due to the extrusion effect of the alkali metal ions with larger radii, compressive stress is generated on the surface of the glass and is called as surface compressive stress;

compressive stress depth (μm): the distance from the surface of the chemically strengthened glass to the location where the compressive stress is zero; and tensile stress linear density CT-LD: the ratio of the tensile stress integral to the thickness of the glass under the thickness section of the glass is obtained according to an SLP stress meter test. As shown in FIG. 3, the strengthened sample will have the following stress distribution curve in which the tensile stress integral is the area of the tensile stress region.

Mark band threshold: CT-LD value of the glass when a mark band is generated on the cross section of the glass during immediate fracture.

Bifurcation threshold: CT-LD value of the glass at which the cross section of the glass bifurcates during immediate fracture.

Figure 4:
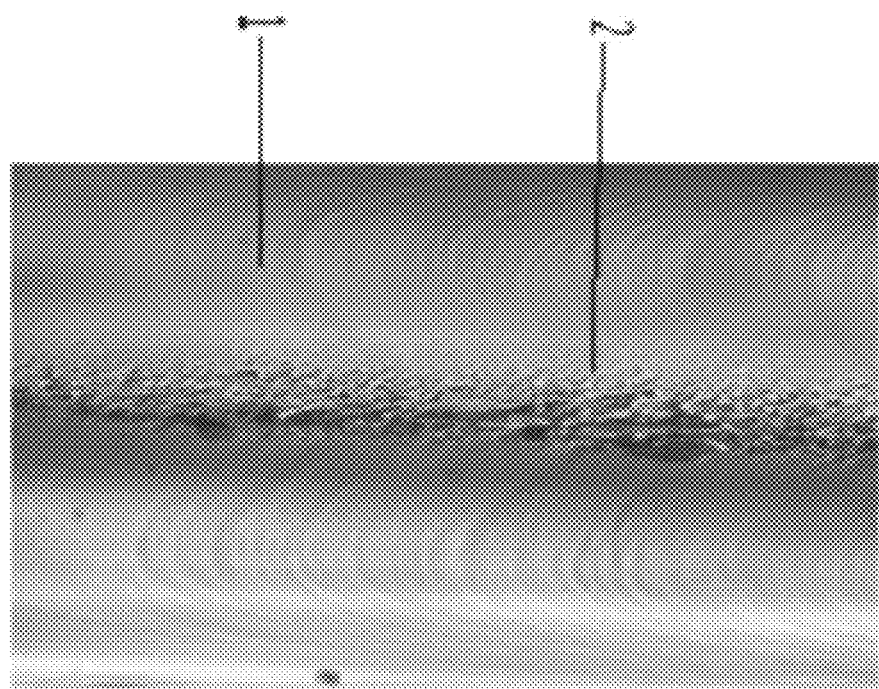
FIG. 4 is a schematic view illustrating a state where a mark band is generated on a fracture surface in glass fracturing in examples of the present invention and comparative examples.

In the limit experiment of the glass, the degree of internal stress of the glass increases along with increasing of strengthening time, shown as an increase in CT-LD, and when CT-LD reaches a certain degree, the glass is fractured with a Vickers hardness indenter, and the cross section of the glass generates a mark band, as shown in FIG. 4. CT-LD when the fracture surface just generates the mark band during glass fracturing becomes the mark band threshold.

If the sample continues to strengthen and increase stress after the mark band appears, the sample is fractured by using the Vickers hardness indenter, and an extension crack generated at a fracturing point starts to be bifurcated after a certain distance. CT-LD when the fracture surface just generates crack bifurcation during glass fracturing becomes the bifurcation threshold.

The process for the foregoing limit experiment is described as follows. A glass sample is placed into a pure sodium nitrate salt bath, the new salt bath is strengthened at 450° C., the glass is taken out every 30 minutes, the temperature is reduced to be below 100° C., the sample is washed with water at room temperature, then the sample is dried to remove the surface moisture, CT-LD of the sample is tested by adopting SLP1000, test data are recorded, the sample is placed into the salt bath, strengthened for 30 minutes, and taken out for testing after the test data are completed, when the characteristics of an inverted-U-shaped parabola appear in the obtained data, fitting is carried out, and the highest point of the obtained parabola is CT-LDmax.

When CT-LD reaches a certain value (the mark band threshold), a mark band appears on the cross section, and if strengthening continues, CT-LD is increased and reaches a certain value (the bifurcation threshold), the sample is bifurcated.

After various property tests are completed, the obtained glass sample having a thickness of 0.7 mm is subjected to ion exchange according to the conditions of the mixed or elemental molten salt composition, the temperature of various ion exchange steps and the ion exchange time shown in table 2 to obtain the strengthened glass.

The sample is subjected to two-step ion exchange, and the specific process is as follows.

IOX1 (first-step ion exchange): 425° C.*100 wt % NaNO₃*6 h (refers to exchange in 100 wt % NaNO₃ molten salt at 425° C. for 6 h; similar expressions herein have a similar meaning to shorthand molten salt temperature, composition and ion exchange time used for ion exchange);

IOX2 (second step ion exchange): 430° C.*97 wt % $KNO_3$+3 wt % $NaNO_3$*2 h (refers to exchange performed in a mixed molten salt of 97 wt % $KNO_3$ and 3 wt % $NaNO_3$ at 430° C. for 2 h).

A waveguide light stress meter FSM-6000LE and a scattered light SLP-1000 stress meter manufactured by the Japan ORIHARA company are used for testing the surface high stress region and the internal deep stress of the strengthened sample respectively. Before and after strengthening of the sample, a quadratic element image measuring instrument is adopted to test the size change and calculate the pantograph ratio.

After strengthening, the sample is subjected to four-point bending and adhesive paper impact falling. Since processing of individual samples leads to deviations in the test, the examples will be run in batches of 20 sheets when subjected to four-point bending and adhesive paper falling impact resistance, with the average values and stability taken as strength characterization. The specific testing method includes that the sample bending resistance strength testing sure, L1 is upper span width, L2 is lower span width, b is glass width, and h is glass thickness.

Figure 6:
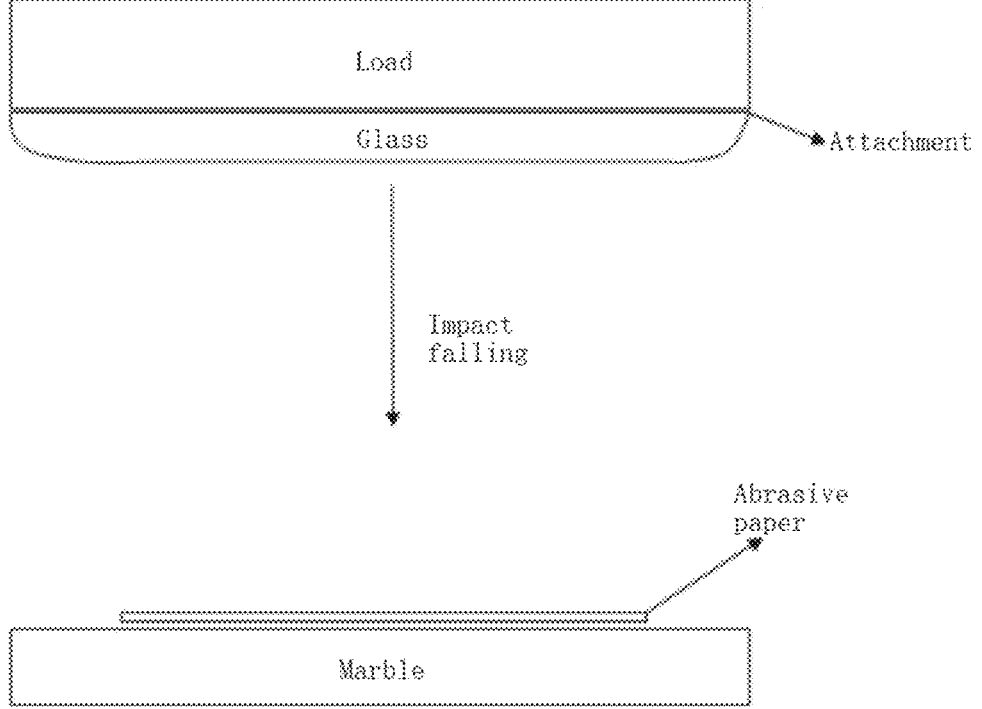
FIG. 6 is a schematic diagram illustrating a method for testing anti-falling strength of the glass in examples of the present invention and comparative examples.
Figure 7:
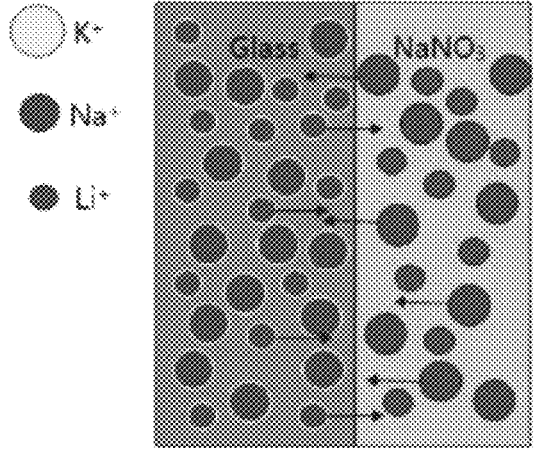
FIG. 7 is a schematic diagram illustrating ion exchange of the glass of the present invention.
Figure 7:
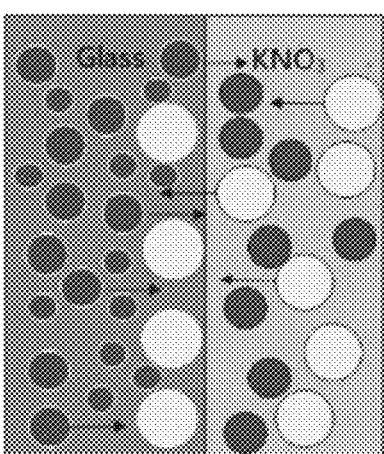

As shown in FIG. 6, FIG. 6 is a schematic diagram of a method for testing the anti-falling strength, and specifically, the method for testing the anti-falling strength includes that a 200 g mold is firmly attached to the strengthened glass sample by adopting a double-sided adhesive tape, the glass sample horizontally falls onto a marble plate attached with 120-mesh abrasive paper on the surface, and the highest point where the glass sample is not broken is taken as the anti-falling strength.

The results of various property parameter measurements are shown in Table 3.

Examples 2-6 and Comparative Example 1

The same operating conditions are followed as in Example 1, except for various respective glass frit compositions for preparing base glass as shown in Table 2, the strengthening conditions for ion exchange of the base glass and the property parameters of the obtained strengthened glass as shown in Table 3.

TABLE 2

Glass Raw Material Batch Formula of Various Examples and Comparative
Examples (amounts of various components refer to mol %)
(Base glass with thickness of 0.7 mm)

| Glass batch formula (total amount 1.6 kg) | Example 1 Batch formula 1 | Example 3 Batch formula 2 | Example 3 Batch formula 3 | Example 4 Batch formula 4 | Example 5 and example 6 Batch formula 5 | Comparative example 1 |
|---|---|---|---|---|---|---|
| $SiO_2$ | 70 | 68 | 65 | 61 | 70 | 60 |
| $Al_2O_3$ | 10 | 13 | 16 | 19 | 11 | 15 |
| $P_2O_5$ | | | | | 1 | 4 |
| $B_2O_3$ | | | | | 2 | 0.5 |
| MgO | 2 | 4 | 4 | 6 | 2 | 0.5 |
| ZnO | | | 1 | 1 | | |
| $ZrO_2$ | 1 | 0.7 | 0.9 | | 1 | |
| $TiO_2$ | | | | | | |
| $Na_2O$ | 2 | 3 | 3 | 5 | 3 | 12 |
| $K_2O$ | 2.8 | 1 | 1.5 | 2.1 | 0.8 | 1 |
| $Li_2O$ | 12 | 10 | 8.5 | 5.5 | 9 | 7 |
| $SnO_2$ | 0.2 | 0.3 | 0.1 | | 0.2 | |
| NaCl | | | | 0.4 | | |

Figure 5:
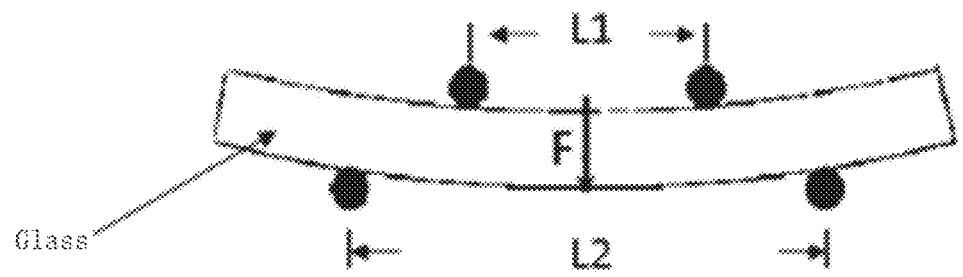
FIG. 5 is a schematic diagram illustrating an anti-bending test in a four-point bending method of the glass in examples of the present invention and comparative examples.

| Property characteristics | Example 1 | Example 2 | Example 3 | Example 4 | Examples 5 and 6 | Comparative example 1 |
|---|---|---|---|---|---|---|
| Density (g/cm³) | 2.421 | 2.438 | 2.447 | 2.468 | 2.423 | 2.418 |
| Atom packing density | 0.555 | 0.555 | 0.548 | 0.550 | 0.557 | 0.550 |
| Photoelastic coefficient | 29.300 | 28.710 | 28.410 | 27.890 | 28.610 | 28.810 |
| Refractive index | 1.512 | 1.517 | 1.510 | 1.517 | 1.511 | 1.515 |
| Young modulus (GPa) | 86.56 | 87.45 | 86.1 | 83.44 | 84.79 | 73.18 |
| Dielectric constant | 6.8 | 6.5 | 6.7 | 6 | 6.3 | 7.8 |
| CT-Ldmax(Mpa/mm) | 60000 | 62450 | 70540 | 58640 | 56320 | 40750 |
| Bifurcation threshold (Mpa/mm) | 49500 | 48650 | 45381 | 43521 | 47620 | 35680 |
| Mark band threshold (Mpa/mm | 40000 | 39860 | 41230 | 38687 | 42100 | 28650 | method is a four-point bending method, specifically, the four-point bending method includes that the obtained strengthened glass sample is subjected to a bending resistance test as shown in FIG. 5, and the final bending resistance strength is calculated according to the following formula: $\delta=3F(L2-L1)/2bh^2$, wherein F is downward pres- As can be seen from table 2, the base glass obtained from the batch formula of the present invention has Young modulus greater than 83 GPa, a dielectric constant less than 7, CT-Ldmax greater than 56000 Mpa/mm, bifurcation threshold greater than 43000 Mpa/mm and mark band threshold greater than 38000 Mpa/mm.

TABLE 3

Ion Strengthening Conditions and Property Parameters of Strengthened Glass (the thickness of the glass is 0.7 mm)

| | Example 1 | Example 2 | Example 3 | Example 4 | Example 5 | Example 5 (batch formula 5) | Comparative example 1 |
|---|---|---|---|---|---|---|---|
| Ion exchange two-step or single-step method | IOX1: 425° C. * 100 wt % NaNO₃ * 6 h IOX2: 430° C. * 97 wt % KNO₃ + 3 wt % NaNO₃ * 2 h | IOX1: 430° C. * 80 wt % NaNO₃ + 20 wt % KNO₃ * 4.5 h IOX2: 440° C. * 94 wt % KNO3 + 6 wt % NaNO₃ * 1.5 h | IOX1: 430° C. * 75 wt % NaNO₃ + 25 wt % KNO₃ * 3 h IOX2: 440° C. * 90 wt % KNO3 + 10 wt % NaNO₃ * 1 h | Single-step strengthening IOX: 440° C. * 12 wt % NaNO₃ + 88 wt % KNO₃ *7 h | Single-step strengthening IOX: 425° C. * 10 wt % NaNO₃ + 90 wt % KNO₃ * 5.5 h | Single-step strengthening IOX: 425° C. * 8 wt % NaNO₃ + 92 wt % KNO₃ 5.5 h | IOX1: 400° C. * 50 wt % NaNO₃ + 50 wt % KNO₃ * 2.5 h IOX2: 410° C. * 100 wt % KNO₃ * 1 h |
| IOXI pantograph ratio | 0.13 | 0.135 | 0.15 | | | | 0.075 |
| IOX2 pantograph ratio | 0.15 | 0.15 | 0.17 | Single-step strengthening 0.2 | Single-step strengthening 0.15 | Single-step strengthening 0.14 | 0.1 |
| Range of a stress difference value of a first subregion of a first stress region (test range: front surface 0 μm-10 μm, and back surface 690 μm-700 μm | 5.3-67 | 7.5-96.5 | 3.3-67 | 6.5-79 | 9.2-76.1 | 9-76 | 8.7-123 |
| Range of a stress difference value of a second subregion of the first stress region (test range: front surface 21 μm (0.03T) to DOL-0-1, back surface | 0.1-3.8 | 0.68-3.5 | 0.4-1.8 | 0.93-3.6 | 0.53-2.9 | 0.51-3 | 2.3-6.2 |
| Range of a stress difference value of a first subregion of a second stress region (test range: front surface 280 μm(0.4T), back surface 420 μm (0.6T) to DOL-0-2) | 0.18-0.9 | 0.09-0.68 | 0.051-0.4 | 0.075-0.68 | 0.081-0.53 | 0.08-0.51 | 0.25-2.3 |
| Range of a stress difference value of a second subregion of the second stress region (test range: 280 μm(0.4T)-420 μm | 0.015-0.18 | 0.025-0.09 | 0.006-0.051 | 0.015-0.15 | 0.008-0.081 | 0.01-0.08 | 0.05-0.25 |
| CT-LD | 45620 | 48520 | 42530 | 39862 | 46824 | 45400 | 26810 |
| CS | 825 | 863 | 752 | 736 | 658 | 692.2 | 1025 |
| CS10 | 264 | 278 | 195 | 174 | 307 | 307.2 | 284 |
| CS30 | 188 | 195 | 154 | 153 | 187 | 152.2 | 112 |
| CS50 | 135 | 141 | 119 | 128 | 132 | 109.3 | 62 |
| CS90 | 65 | 67 | 52 | 49 | 66 | 48.6 | 34 |
| CS120 | −1.3 | 3.2 | 2 | 5.8 | 7 | 10.3 | 4 |

TABLE 3-continued

Ion Strengthening Conditions and Property Parameters of Strengthened Glass (the thickness of the glass is 0.7 mm)

| | Example 1 | Example 2 | Example 3 | Example 4 | Example 5 | Example 5 (batch formula 5) | Comparative example 1 |
|---|---|---|---|---|---|---|---|
| CS150 | −32 | −35 | −31 | −25 | −32 | −20.3 | −19 |
| CS200 | −65 | −68 | −62 | −58 | −61 | −55.6 | −36 |
| CS250 | −75 | −77 | −71 | −75 | −73 | −75.2 | −48 |
| CS300 | −81 | −84 | −75 | −77 | −80 | −84.2 | −54 |
| CS350/CT-CV | −84.4 | −89.4 | −76.4 | −80.8 | −82.8 | −87.17 | −57.8 |
| DOL-0 | 119 | 125 | 122 | 131 | 127 | 129 | 135 |
| Percentage of the ratio of DOL-0 to the total thickness of the glass to the thickness of the glass (%) | 17.0 | 17.9 | 17.4 | 18.7 | 18.1 | 18.2 | 19.3 |
| Four-point bending average strength (Mpa) | 856.0 | 827.0 | 768.0 | 758.0 | 746.0 | 781.0 | 652.0 |
| Difference between maximum value and minimum value of four-point bending average strength (Mpa) | 50.0 | 80.0 | 75.0 | 60.0 | 43.0 | 45.3 | 420.0 |
| Sand-resistant surface average impact strength (m) | 1.7 | 1.9 | 1.56 | 1.5 | 1.75 | 1.53 | 0.76 |
| Difference between maximum value and minimum value of anti-falling strength (m) | 0.4 | 0.5 | 0.5 | 0.4 | 0.5 | 0.5 | 0.8 |

Note:
all the foregoing stress units are Mpa.

In foregoing Table 3, the stress difference value is the calculated stress difference value after testing at a stress point depth every half-micrometer thickness from the position of 0 micrometer of the surface of the glass to the center of the thickness, namely the absolute value of the difference between the compressive stress (CS) at the first 0.5 micrometer and the compressive stress (CS) at the last 0.5 micrometer; and each range of stress difference value in the table above refers to the range from the minimum stress difference value to the highest stress difference value in each measured thickness interval.

As can be seen from Table 3, examples 1-5 of the present invention are compared to the prior product comparative example 1. In the example, the silicon-aluminum content is higher than that of the comparative example 1, and the alkali metal ($Na_2O+Li_2O+K_2O$) is less than that of the comparative example, so that the intrinsic network structure of the sample in the present invention is higher than that of an existing product. Specifically, the Young modulus of the sample in the example of the present invention is greatly higher than that of the comparative example 1, improvement of the Young modulus indicates that the anti-deformation ability of the glass is enhanced, moreover, reduction of the alkali metal is beneficial for reducing the dielectric constant of the glass, and the reduction effect of the material of the cover plate glass on signals in 5G mobile phone application is reduced.

Besides, the strength of the glass is related to an intrinsic network structure and a stress state of the glass;

in the present invention, the silicon-aluminum ratio is increased to obtain a compact network structure, and the sodium and lithium components are controlled, so that the sodium content is greatly reduced while the lithium content is increased, sodium-lithium exchange is facilitated, the high-degree deep compressive stress is obtained, and the corresponding characteristic includes that CT-LD representing the stress state may greatly exceed that of the existing product comparative example 1. Therefore, after final strengthening, CT-LD of the examples 1-5 of the present invention is higher than that of the comparative example 1, so that the anti-falling strength, namely the impact strength, is much higher than that of the existing product. Due to the fact that the Young modulus is high, the surface CS is low, and the stress difference value is controlled to be 100 MPa, microcracks caused by stress change on the surface are reduced, the four-point bending strength is higher than that of the comparative example 1, and the results of the same batch are stable. While the stress difference value in the comparative example 1 is too high, although it has CS of 1000 MPa, the surface microcracks are high, instability between batches is caused, and lots of high and low values cause low four-point bending strength.

For safety, the enhanced network structure increases the internal stress that can be safely accommodated inside the glass, specifically, as the bifurcation threshold of the glass is higher than that of the comparative example, the glass is broken when higher stress exists, and fragments are not too small to affect use. CT-LD strengthened by the examples of the present invention is controlled within the bifurcation threshold, and strength and crushing safety are both considered.

In the foregoing Table 4, the stress difference value is the calculated stress difference value after testing at a stress point depth every half-micrometer thickness from the position of 0 micrometer of the surface of the glass to the center of the thickness, namely the absolute value of the difference between the compressive stress (CS) at the first 0.5 micrometer and the compressive stress (CS) at the last 0.5 micrometer; and each range of stress difference value in the foregoing table refers to the range from the minimum stress difference value to the highest stress difference value in each measured thickness interval.

As can be seen from Table 4, the stress curve distribution range has effect of controlling the surface CS, deep stress CS-50, tensile stress CT values and change degree of the sample, so that the values are in an optimal range, the network structure ability and stress state of the glass may be well exerted, and the optimal anti-falling ability and safety are obtained. No standard strengthening is performed in the batch formula 3, and the stress distribution is not within the

TABLE 4

Strengthening Conditions and Property Parameters after Strengthening
of Glass Samples in Comparative Example 2 and Comparative Example 3

| | Comparative example 2 (thickness is 0.7 mm) | Comparative example 3 (thickness is 0.7 mm) |
|---|---|---|
| IOX1 | IOX1: 420° C.*100 wt % NaNO3 *2 h | IOX1: 430° C.*100 wt % NaNO3*6 h |
| IOX2 | IOX2: 420° C.*92 wt % KNO3 + 8 wt % NaNO*2 h | IOX2: 440° C.*90 wt % KNO3 + 10 wt % NaNO*0.5 h |
| IOX1 pantograph ratio | 0.08 | 0.17 |
| IOX2 pantograph ratio | 0.125 | 0.175 |
| Range of a stress difference value of a first subregion of a first stress region | 15.7-85 | 2.5-66.5 |
| Range of a stress difference value of a second subregion of the first stress region | 1.5-4.9 | 0.51-1.5 |
| Range of a stress difference value of a first subregion of a second stress region | 0.55-1.5 | 0.05-0.51 |
| Range of a stress difference value of a second subregion of a second stress region | 0.09-0.55 | 0.01-0.05 |
| CT-LD | 33514 | 64520 |
| CS | 885 | 753 |
| CS10 | 197 | 368 |
| CS30 | 132 | 234 |
| CS50 | 72 | 165 |
| CS90 | 35 | 97 |
| CS120 | 2 | 34 |
| CS150 | −9 | −23 |
| CS200 | −26 | −68 |
| CS250 | −41 | −92 |
| CS300 | −50 | −109 |
| CS350/CT-CV | −55.4 | −117.4 |
| DOL-0 | 124 | 128 |
| Percentage of the ratio of DOL-0 to total thickness of glass to thickness of the glass (%) | 17.7 | 18.3 |
| Four-point bending strength (Mpa) | 826.0 | 787.0 |
| Difference between a maximum value and a minimum value of four-point bending average strength (Mpa) | 120.0 | 60.0 |
| Sand-resistant surface impact strength (m) | 1.1 | 2.3 |
| Difference between a maximum value and a minimum value of anti-falling strength (m) | 0.4 | 1.5 |

Note:
the formula of a glass sample (before strengthening) in comparative examples 2 and 3 is a batch formula 3 in example 3.
Note:
all the foregoing stress units are MPa; and ranges of glass test thickness corresponding to the ranges of the stress difference values of various subregions in Table 4 are the same as various conditions in Table 3.

range of the formula, as in the comparative examples 2 and 3. The comparative example 2 shows that the deep stress is insufficient and CS-50 and CT-LD are lower due to the fact that the comparative example 2 is at the upper limit of the stress curve, and the anti-falling strength is severely reduced compared with that of example 3. The comparative example 3 is already at the lower limit of stress curve distribution, which indicates that the deep stress is relatively large and exceeds the bifurcation threshold, the network structure of the glass cannot safely control the internal stress, and the internal defect is increased due to too high stress. Therefore, although the falling strength is high, the batch falling result is not stable and is prone to low values, and when the glass sample is broken, fine fragments smaller than 1 mm are formed and are splashed around, and insecurity is caused.

As can be seen from the Table 5, the glass samples of the present invention well meet the characteristics of the stress curve distribution schematic diagram shown in FIG. 1 after the strengthening process is performed on glass samples with different thicknesses, especially before 0.45-0.85 mm, and it is ensured that CT-LD of the glass samples may be stabilized within a range close to the bifurcation threshold.

What is claimed is:

1. A chemically strengthened glass, having a front surface and a back surface and wherein a thickness T between the front surface and the back surface is within a range of 0.45-0.85 mm, and wherein stress distribution of the chemically strengthened glass meets following conditions:

the chemically strengthened glass having stress distribution with the following characteristics: the chemically

TABLE 5

Glass Samples with Different Thicknesses, Strengthening Conditions and Property Parameters of Strengthened Glass in Example 5

| Thickness and ion exchange conditions of glass samples obtained in example 5 | 0.55 mm | 0.65 mm | 0.8 mm |
|---|---|---|---|
| IOX1 IOX2 | Single-step strengthening IOX: 425° C.*10 wt % NaNO$_3$ + 90 wt % KNO$_3$*3.5 h | Single-step strengthening IOX: 425° C.*10 wt % NaNO$_3$ + 90 wt % KNO$_3$*7 h | Single-step strengthening IOX: 425° C.*10 wt % NaNO$_3$ + 90 wt % KNO$_3$*10 h |
| Range of a stress difference value of a first subregion of a first stress region | 1.67-70.46 | 5.1-68.5 | 7.8-65 |
| Test range | Front surface 0 μm-10 μm Back surface 550 μm-540 μm | Front surface 0 μm-10 μm Back surface 650 μm-640 μm | Front surface 0 μm-10 μm Back surface 800 μm-790 μm |
| Range of a stress difference value of a second subregion of the first stress region | 0.65-1.55 | 0.95-2 | 1.03-3.3 |
| Test range | Front surface 16.5 μm(0.03 T)- DOL-0-1, Back surface DOL-0-2-553.5 μm(0.97 T) | Front surface 19.5 μm(0.03 T)- DOL-0-1, Back surface DOL-0-2-630.5 μm(0.97 T) | Front surface 24 μm(0.03 T)- DOL-0-1, Back surface DOL-0-2-776 μm(0.97 T) |
| Range of a stress difference value of a first subregion of a second stress region | 0.045-0.65 | 0.084-0.95 | 0.098-1.03 |
| Test range | Front surface DOL-0-1-220 μm(0.4 T), Back surface 330 μm(0.6 T)-DOL-0-2 | Front surface DOL-0-1-260 μm(0.4 T), Back surface 390 μm(0.6 T)-DOL-0-2 | Front surface DOL-0-1-320 μm(0.4 T), Back surface 480 μm(0.6 T)-DOL-0-2 |
| Range of a stress difference value of a second subregion of the second stress region | 0.00045-0.045 | 0.001-0.084 | 0.001-0.098 |
| Test range | 220 μm(0.4 T)-330 μm (0.6 T), | 260 μm(0.4 T)-390 μm (0.6 T), | 320 μm(0.4 T)-480 μm (0.6 T), |
| CT-LD | 42850 | 43800 | 45902 |
| CS | 712 | 674 | 658 |
| CS10 | 257 | 295 | 384 |
| CS30 | 132 | 149 | 190 |
| CS50 | 81 | 110 | 147 |
| CS90 | 5.9 | 41 | 70 |
| CS120 | −29.8 | 1.3 | 23 |
| CS150 | −51 | −29 | −13.9 |
| CS200 | −66 | −60 | −55 |
| CS250 | −71 | −75 | −76 |
| CS300 | | −80 | −86 |
| CS350 | | −82 | −89 |
| CS400 | | | −89 |
| DOL-0 | 96 | 122 | 138 |

Note: all the foregoing stress units are MPa.

In the foregoing Table 5, the stress difference value is the calculated stress difference value after testing at a stress point depth every half-micrometer thickness from the position of 0 micrometer of the surface of the glass to the center of the thickness, namely the absolute value of the difference between the compressive stress (CS) at the first 0.5 micrometer and the compressive stress (CS) at the last 0.5 micrometer; each range of stress difference value in the table above refers to the range from the minimum stress difference value to the highest stress difference value in each measured thickness interval.

strengthened glass comprising a first stress region and a second stress region, wherein the first stress region is a compressive stress region, the second stress region is a tensile stress region, wherein DOL-0 is the depth at which the compressive stress is 0, DOL-0-1 is the depth at which the compressive stress is 0 from a front surface, DOL-0-2 is the depth at which the compressive stress is 0 from a back surface;

wherein the ratio between DOL-0 and the total thickness of the glass shall not be less than 17%;

wherein CS-30 of the chemically strengthened glass meets the following formula, CS-30=a*exp(−T/b)+c, wherein CS-30 is compressive stress of the depth of 30 micrometers distant from the surface of the strengthened glass; a is −485; b is 0.5; c is 278+(+40/$T^2$ or −40 T2); T is the thickness of the strengthened glass, and the unit is mm;

wherein the glass is prepared by using raw materials comprising oxides at following proportions in mol %:

| Composition | mol % |
| --- | --- |
| $SiO_2$ | 55%-75% |
| $Al_2O_3$ | 8%-22% |
| $B_2O_3$ | 0%-5% |
| $P_2O_3$ | 0%-5% |
| MgO | 1%-8% |
| ZnO | 0-2% |
| $ZrO_2$ | 0-2% |
| $TiO_2$ | 0-2% |
| Na20 | 0%-5% |
| $Li_2O$ | 4%-13% |
| $K_2O$ | 0-5% |
| $SnO_2$ | 0.1%-2%. |

2. The chemically strengthened glass according to claim 1, wherein the raw materials comprises oxides at following proportions in mol %:

| Composition | mol % |
| --- | --- |
| $SiO_2$ | 61-70% |
| $Al_2O_3$ | 10-19% |
| $B_2O_3$ | 0% |
| $P_2O_3$ | 0% |
| MgO | 2-6% |
| ZnO | 0-1% |
| $ZrO_2$ | 0.5-1% |
| $TiO_2$ | 0.5-1% |
| $Na_2O$ | 2-5% |
| $Li_2O$ | 5.5-12% |
| $K_2O$ | 1-2.8% |
| $SnO_2$ | 0.1-0.4%. |

3. The chemically strengthened glass according to claim 1, wherein the raw materials meets any one of following conditions:

total mol percentage composition of $SiO_2$ and $Al_2O_3$ is greater than 80 mol %;

$Na_2O$ is 3%-5% in mol %;

$Li_2O$ is 8%-12% in mol %;

$Na_2O+Li_2O$ is 10.5%-18% in mol %;

or, MgO is 26%-7.5% in mol %.

4. The chemically strengthened glass according to claim 3, wherein the raw materials component content of the glass meets any one of following conditions:

$Li_2O$ is 8.5%-12% in mol %;

or, $Na_2O+Li_2O$ is 10.5%-14% in mol %.

5. The chemically strengthened glass according to claim 1, wherein the compressive stress region has a first subregion, the first subregion of the compressive stress region is a region from the surface of the glass to a depth of 10 μm below the surface; the wherein a compressive stress difference value exists in the first subregion wherein the minimum value is greater than 1 Mpa and the maximum value is smaller than 100 Mpa;

and wherein the compressive stress difference value of the compressive stress region is defined as an absolute value of the difference between compressive stress at first 0.5 micrometer and compressive stress at last 0.5 micrometer.

6. The chemically strengthened glass according to claim 1, wherein the compressive stress region has a second subregion, the second subregion of the compressive stress region is a region of 0.03 T to DOL-0-1 and a region of DOL-0-2 to 0.97 T of the glass thickness and a compressive stress difference value exists in the second subregion is between 0.5-5 Mpa;

and the compressive stress difference value of the compressive stress region is defined as an absolute value of the difference between compressive stress at first 0.5 micrometer and compressive stress at last 0.5 micrometer.

7. The chemically strengthened glass according to claim 5, wherein the minimum value of the compressive stress difference value in the first subregion of the compressive stress region is greater than 5 Mpa.

8. The chemically strengthened glass according to claim 6, wherein a range of the compressive stress difference value in the second subregion of the compressive is 0.5-3.5 Mpa.

9. The chemically strengthened glass according to claim 5, wherein the minimum value of the compressive stress difference value in the first subregion of the compressive stress region is greater than 7 Mpa.

10. The chemically strengthened glass according to claim 5, wherein the minimum value of the compressive stress difference value in the first subregion of the compressive stress region is greater than 10 Mpa.

11. The chemically strengthened glass according to claim 1, wherein the chemically strengthened glass is prepared by a multi-step strengthening method, and wherein the multi-step strengthening method comprises two-step strengthening, in the first step, salt bath comprising $NaNO_3$ and $KNO_3$ with a 75-100 wt % $NaNO_3$ is adopted and in the second step, salt bath comprising $NaNO_3$ and $KNO_3$ with a 0-10 wt % $NaNO_3$, is adopted.

12. The chemically strengthened glass according to claim 11, wherein the temperature in the first step is 425-430° C. and ion exchange lasts for 3-7 h; and the temperature of the second step is 430-440° C. and ion exchange lasts for 1-3 h.

13. The chemically strengthened glass according to claim 1, wherein the highest value of the tensile stress of the tensile stress region in the center of the glass is smaller than 100 Mpa.

14. The chemically strengthened glass according to claim 1, wherein the highest value of tensile stress of the tensile stress region in the center of the glass is smaller than 90 Mpa.

15. The chemically strengthened glass according to claim 1, wherein the tensile stress region has a first subregion, the first subregion of the tensile stress region is a region of DOL-0-1 to 0.4 T and 0.6 T to DOL-0-2 and the tensile stress difference value of the first subregion is smaller than 0.8 Mpa; and/or, wherein the tensile stress region has a second subregion, the second subregion region of the tensile stress region is the range of 0.4 T-0.6 T and the tensile stress difference value of the second subregion is smaller than 0.1 Mpa;

and the tensile stress difference value of the tensile stress region is defined as an absolute value of the difference between tensile stress at first 0.5 micrometer and tensile stress at last 0.5 micrometer.

16. The chemically strengthened glass according to claim 1, wherein the chemically strengthened glass is used in a display screen of a mobile phone, a display screen of a tablet personal computer, a handheld game player and a display screen of a portable digital device.

17. The chemically strengthened glass according to claim 1, wherein wherein a tensile stress difference value of the tensile stress region is smaller than a compressive stress difference value of the compressive stress region; the tensile stress region has a first subregion, the first subregion of the tensile stress region is a region of DOL-0-1 to 0.4 T and 0.6 T to DOL-0-2, the stress difference value of the first subregion is smaller than 1 Mpa; and the tensile stress region has a second subregion, the range of the second subregion region is 0.4 T-0.6 T, and the tensile stress difference value of the second subregion is smaller than 0.2 Mpa;

the tensile stress difference value of the tensile stress region is defined as an absolute value of the difference between tensile stress at first 0.5 micrometer and tensile stress at last 0.5 micrometer; and the compressive stress difference value of the compressive stress region is defined as an absolute value of the difference between compressive stress at first 0.5 micrometer and tensile stress at last 0.5 micrometer.

18. The chemically strengthened glass according to claim 1, wherein $Al_2O_3$ in the raw materials is 11%-13% in mol %; or $SiO_2$ in the raw materials is 61%-68% in mol %; or $Li_2O$ in the raw materials is 10%-12% in mol %.

\* \* \* \* \*